(12) United States Patent
Febrer et al.

(10) Patent No.: US 8,412,408 B2
(45) Date of Patent: Apr. 2, 2013

(54) PARKING BRAKE SYSTEM WITH ELECTRIC CONTROL

(75) Inventors: Pascal Febrer, Paris (FR); Gael Hedouin, Paris (FR); Ramiro Rodriguez, Velaux (FR)

(73) Assignee: Renault S.A.S., Boulogne-Billancourt (FR)

( * ) Notice: Subject to any disclaimer, the term of this patent is extended or adjusted under 35 U.S.C. 154(b) by 302 days.

(21) Appl. No.: 12/518,660

(22) PCT Filed: Dec. 6, 2007

(86) PCT No.: PCT/EP2007/063448
§ 371 (c)(1),
(2), (4) Date: Apr. 4, 2011

(87) PCT Pub. No.: WO2008/071623
PCT Pub. Date: Jun. 19, 2008

(65) Prior Publication Data
US 2012/0296516 A1 Nov. 22, 2012

(30) Foreign Application Priority Data
Dec. 11, 2006 (FR) ...................... 06 10794

(51) Int. Cl.
*G06F 11/30* (2006.01)
(52) U.S. Cl. ........................ 701/34.4; 701/70; 303/152
(58) Field of Classification Search ................. 701/34.4, 701/70, 78; 303/20, 152, 169
See application file for complete search history.

(56) References Cited

U.S. PATENT DOCUMENTS

| 5,366,281 | A | * | 11/1994 | Littlejohn | 303/3 |
| 5,539,641 | A | * | 7/1996 | Littlejohn | 701/70 |
| 6,488,343 | B1 | | 12/2002 | Eberling et al. | |
| 7,121,633 | B2 | * | 10/2006 | Tachiiri et al. | 303/20 |
| 2003/0057766 | A1 | | 3/2003 | Eberling et al. | |
| 2004/0113489 | A1 | | 6/2004 | Iwagawa et al. | |
| 2006/0163939 | A1 | | 7/2006 | Kuramochi et al. | |

FOREIGN PATENT DOCUMENTS

| CA | 2 381 786 | 2/2001 |
| EP | 1 686 029 | 8/2006 |
| JP | 2001 106057 | 4/2001 |
| JP | 2005 81964 | 3/2005 |

* cited by examiner

*Primary Examiner* — Gertrude Arthur Jeanglaude
(74) *Attorney, Agent, or Firm* — Oblon, Spivak, McClelland, Maier & Neustadt, L.L.P.

(57) ABSTRACT

A system including a calculator and a control housing including switches having a single stable position in an opened position and with a manual control member for the switches. The control member is of monostable type with automatic return into a rest position in which all switches are open. The housing includes: a single first switch controlling actuation of brakes and adapted to be closed upon an action on the control member in a first direction; a single second switch controlling release of the brakes and adapted to be closed upon an action on the control member in a second direction opposite the first direction; and a diagnosis circuit providing, according to the position of the control member, an analog information distinguishing between a system activated state in which one of the first and second switches is closed, a system deactivated state in which the first and second switches are open, and malfunction states.

5 Claims, 3 Drawing Sheets

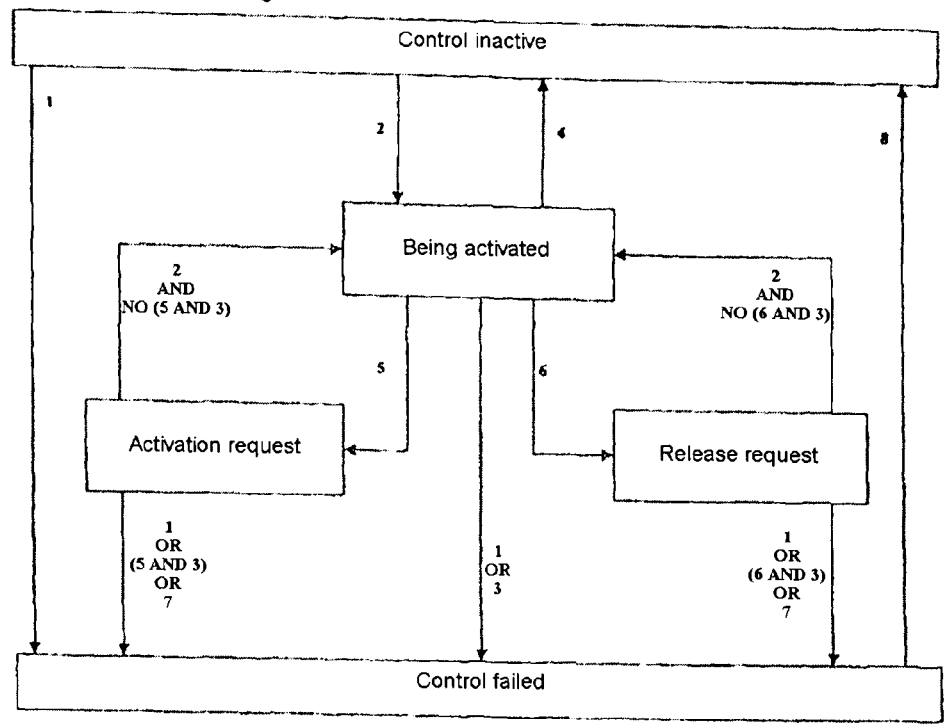
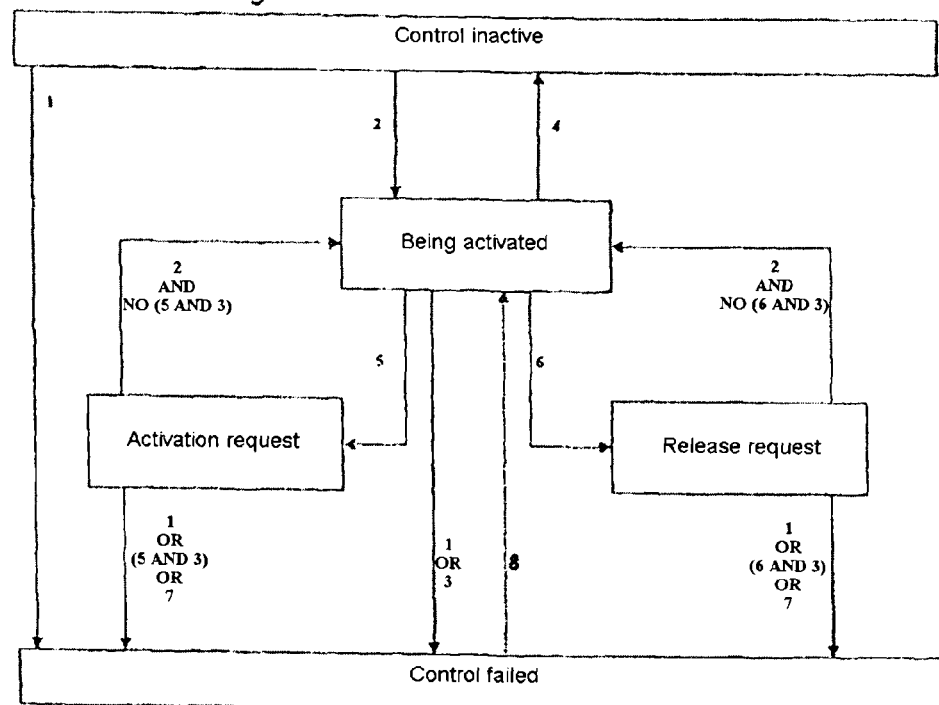

PARKING BRAKE SYSTEM WITH ELECTRIC CONTROL

The present invention relates to a parking brake system with electric control, and more particularly the means of controlling the actuation and releasing of the brake, and their operating logic.

Already known are various parking brake electric control systems, the control means generally being a system of switches actuated by a pushbutton/pull knob or an "arm". Parking brake systems with electric control are described notably in CA2381786, JP2001106057, JP2005081964.

A parking brake electric control must on the one hand make it possible to transmit the will of the driver reliably, such that:
pulling on the control knob ensures actuation of the brake,
pushing the control knob ensures release;
and on the other hand avoid any involuntary actuation or releasing action.

Currently, parking brake electric controls generally comprise four or even six switches, intended to make the electrical contacts respectively required for each function, namely, on the one hand, the brake release control and on the other hand the actuation control. At rest, all the switches are open. A brief pulse, but one of sufficiently long duration, on the control knob or arm in a first direction closes the switches dedicated to a function, for example the actuation of the brake, which remains actuated when the knob or the arm is released and returns by itself to the rest position. Another pulse on the control knob or arm in the opposite direction closes the switches dedicated to the second function, or the releasing of the brake, which, similarly, remains released when the knob or the arm is released and returns to the rest position.

The use of a plurality of switches for each function is intended to ensure, by their redundancy, better safety, notably preventing, for example, a spurious electrical signal, for example a short circuit on one of the electrical connections, from being able to provoke, on its own, and in an inopportune and dangerous manner, a control of the brake. The switch redundancy means that the command will be actually executed only if all the associated switches are closed. It will easily be understood in practice that, for example, it is absolutely necessary for such an electrical fault not to be able to provoke an untimely actuation of the brakes when the vehicle is moving normally. Similarly, it is equally essential for an electrical fault not to be able to provoke a releasing of the brake on a vehicle that is stopped, for example, on a slope.

However, this redundancy leads to an increase in the number of switches.

The aim of the present invention is to achieve a saving by reducing the number of switches needed without compromising the safety and the reliability of the control, and while ensuring conformity to the regulations through its activation logic.

With these objectives in mind, the subject of the invention is a parking brake system with electric control comprising a control housing provided with switches having a single stable position in the open position, and a manual control member for said switches, said control member being of the monostable type with automatic return to a rest position in which all the switches are open,
characterized in that the housing comprises:
a single first switch for controlling the actuation of the brakes, arranged to be closed by an action on the control member in a first direction,
a single second switch for controlling the releasing of the brakes, arranged to be closed by an action on the control member in a second direction, opposite to the first,
a diagnosable circuit arranged to supply, depending on the position of the control member, analog information making it possible to distinguish between an activated state in which one of said first and second switches is closed, a deactivated state where said first and second switches are open, and failed states.

The aim of the diagnosable circuit, which is connected to a current source, is to supply, through the voltage value measured at its terminals, and in addition to the signal resulting from the closure of one of the two switches, an indication that is not limited to a single binary signal, of the switch closed or switch open type, but is also capable of signaling other states of the circuit, such as, notably, a circuit break, a short circuit to ground, or a short circuit on the power supply. To provide this function, mechanical, optical or magnetic systems can be envisaged, provided that the voltage delivered in the activated state is different from the voltage delivered in the inactive state, and both different from the voltages delivered in open circuit, short circuit to ground and short circuit on the power supply.

Preferably the diagnosable circuit includes for the aforementioned purposes a third switch arranged to be closed by an action on the control member regardless of the direction of this action, and two resistors on the one hand both connected to ground and on the other hand respectively connected either side of the third switch.

Thus, this circuit makes it possible to be able to measure at its terminals:
a first voltage level corresponding to the open position of the third switch, and being the voltage at the terminals of one of the two resistors,
a second voltage level corresponding to the closed position of the third switch, and being the voltage at the terminals of the group of the two parallel associated resistors,
a third voltage level corresponding to a break-type failure of the circuit, and being a voltage with a level greater than the first two levels, and notably the voltage of the current source,
a fourth voltage level corresponding to a short circuit-type failure of the circuit, and being a voltage with a level less than the first two levels, and notably a substantially zero voltage.

To express this ability of the diagnosable circuit to supply a plurality of indications through just the third switch, this circuit will also be referred to as diagnosable switch or else analog switch.

To analyze the different signals supplied by the control housing, and notably to determine the different voltages mentioned hereinabove, those at the terminals of the first and second switches, and their trend over time, the control housing is linked to a computer which includes means of measuring the voltage at the terminals of the diagnosable circuit and the voltages at the terminals of the first and second switches.

The computer is provided with an internal clock and filtering circuits for determining the level of a voltage according to predetermined voltage thresholds and the holding time of one of said voltages according to predetermined time thresholds, and fitted with a logic circuit able to deduce from said voltages and from their combination and from the time, a brake actuation or releasing command indication representative of the actual action exerted on the control member.

Such a logic will be detailed hereinbelow. Among its functions, particularly noteworthy are:
a minimum closure time common to one of the first and second switches and the third switch, a verification that the closure of a switch is not due to a chance external cause, for example an external impact on the vehicle which would be likely to accidentally actuate a switch, a verification that the actuation time of the switches is within a predefined range, for example, for an action on the part of the user on the control member to be taken into account only if this time is greater than a predetermined minimum time, but, conversely, that it is actually taken into account even if this time is short, which implies a responsiveness of the system.

To these ends, the computer will therefore include filtering circuits arranged and set to meet the specific requirements of the control system of a determined type of vehicle or application.

Other features and benefits will become apparent from the description that will be given of a system in accordance with the invention.

Reference will be made to the appended drawings in which:

FIG. 6 illustrates the operating logic of the control system as a whole, FIG. 7 illustrates a variant of the operating logic of the control system as a whole.

Figure 1:
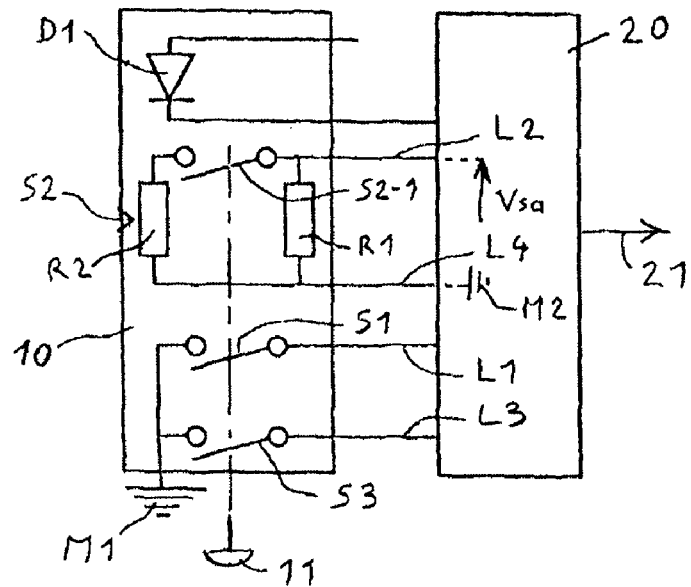
FIG. 1 is a representation of the system in the stable rest position.

The system represented in FIG. 1 comprises a control housing 10 connected to a computer 20, which supplies at an output 21 a brake driving signal, to actuate or release the brakes.

The control housing comprises a first switch S1 for actuating the brakes, a second switch S3 for releasing the brakes, a diagnosable circuit consisting of a diagnosable analog switch S2 comprising a third switch S2-1, and a control light-emitting diode Dl.

The actuation S1 and release S3 switches are normally open, as represented in FIG. 1. They are linked by lines L1 and L3 to the computer 20 and short circuit their links L1 and L3 to ground M1 of the vehicle when they are closed.

Figures 2, 3:
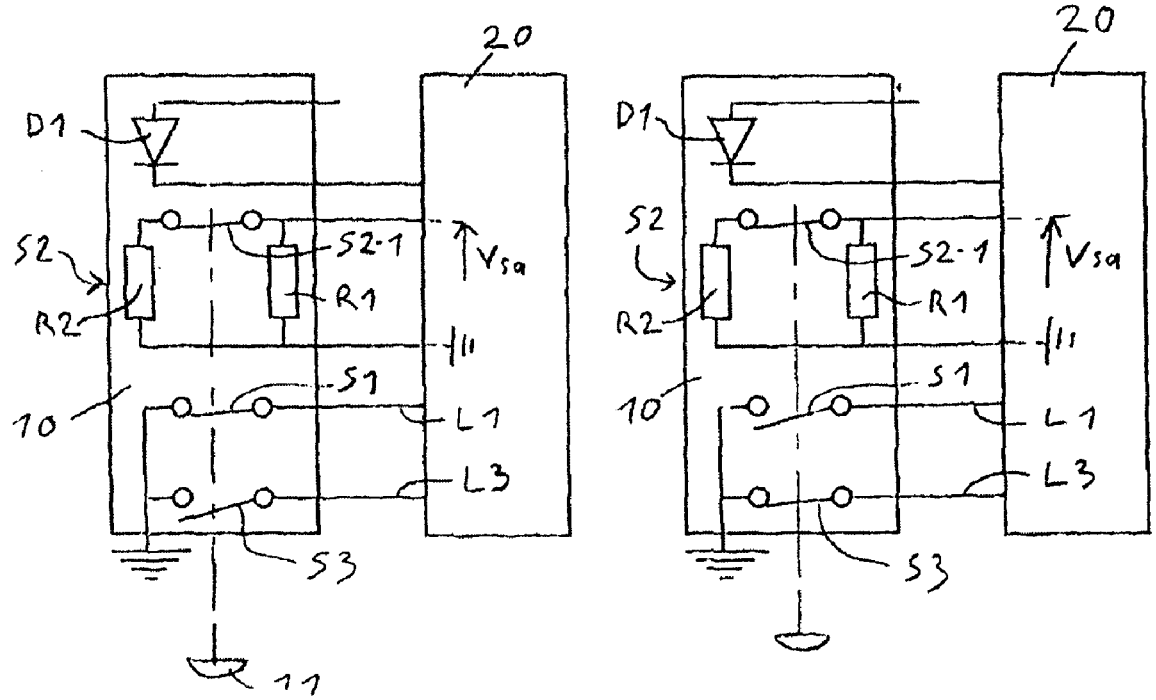
FIG. 2 is a corresponding view in the brake actuation control position.
FIG. 3 is a corresponding view in the brake releasing control position.

A pull/pushbutton 11, or other equivalent manual control member, is arranged so as to control the closure of the switches S1, S3 and S2-1 as follows:

an action on the button 11 in a predetermined first direction, such as the actuation direction, brings about the substantially synchronous closure of the switches S1 and S2-1, as illustrated in FIG. 2, an action on the button 11 in the predetermined reverse direction, such as the releasing direction, brings about the closure of the switches S3 and S2-1, as illustrated in FIG. 3.

Moreover, this pull/pushbutton 11 is also arranged so that it is automatically returned to the rest position, represented in FIG. 1, in which the three switches S1, S3 and S2-1 are all open.

The diagnosable analog switch S2 also comprises a first resistor R1, of relatively high value, for example 2700 ohms, connected between the line L2, linking a terminal of the switch S2-1 to the computer 2, and the line L4 linked to ground M2 of the computer, and a second resistor R2, of relatively low value, for example 180 ohms, connected between the other terminal of the switch S2-1 and the line L4. The computer 2 permanently reads a voltage Vsa on the line L2 which is therefore variable according to the closed or open state of the switch S2-1 and any failures of the diagnosable switch S2.

Figure 4:
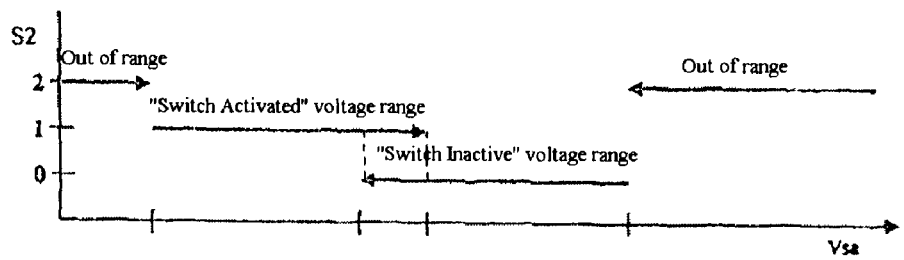
FIG. 4 is a representation of the different states of the analog switch according to the voltages measured at the terminals of the diagnosable circuit.

As illustrated in FIG. 4, the voltage Vsa can therefore change in different bands of values each determining a state of the analog switch S2:

in the absence of faults and with the switch S2-1 open, Vsa is the voltage measured at the terminals of the high-value resistor R1, and is located in a high voltage band, for example from 2.6 to 4.59 volts, corresponding to an inactive level "N0" of the analog switch S2.

in the absence of faults and with the switch S2-1 closed, Vsa is the voltage measured at the terminals of the parallel group of R1 with R2 which has a low resistance value, and is located in a low voltage band, for example from 0.5 to 2.1 volts, corresponding to an active level "N1" of the analog switch.

in the event of a short circuit to ground, Vsa is very low, for example less than a minimum threshold of 0.4 volts, and in the event of a short circuit on the power supply, Vsa is greater than a maximum threshold of, for example, 4.6 volts. In the latter two cases, the analog switch is in a failure level "N2".

To take into account also the chances of electrical contacts of the switch S2-1, the three states of the analog switch S2 are in fact validated only by the holding of the measured voltage Vsa within one of said bands for a predetermined minimum time, called filtering time. The filtering time can be the same or different for each voltage band.

Figure 5:
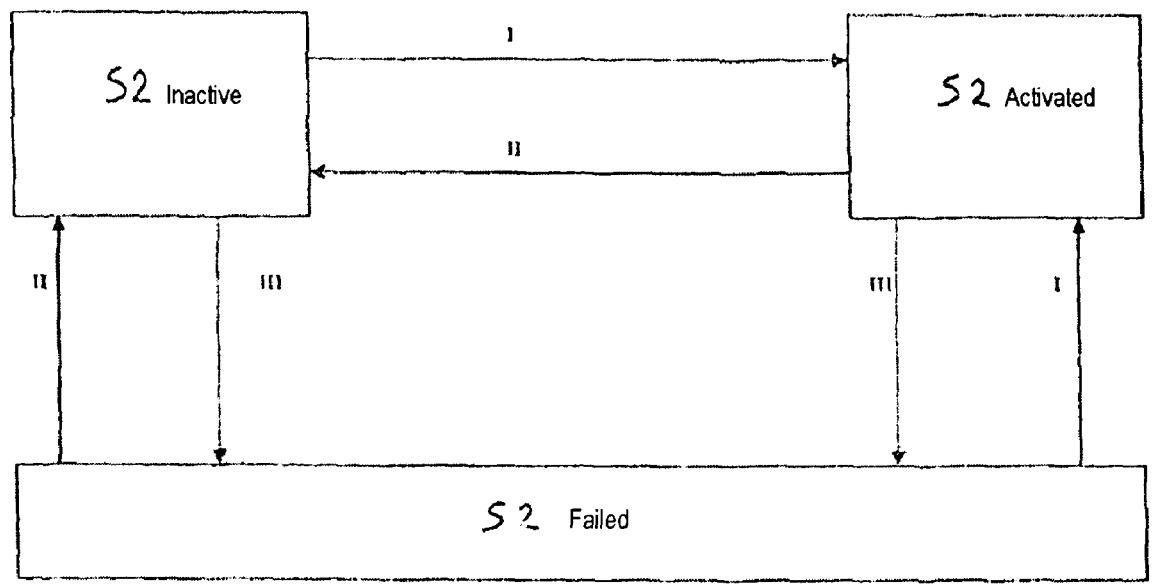
FIG. 5 is a diagram illustrating the operating logic of the analog switch.

Taking account of this filtering time, the operating logic of the analog switch S2 is illustrated in FIG. 5:

the analog switch S2 is considered to be activated if, starting from any inactive or failed state, the following condition I is met: Vsa belongs to the voltage band of level "N1" for a time longer than a first filtering time $t_I$, the analog switch S2 is considered inactive if, starting from any activated or failed state, the following condition II is met: Vsa belongs to the voltage band of level "N0" for a time longer than a second filtering time $t_{II}$, the analog switch S2 is considered to have failed if the following condition III is met: Vsa is in one of the bands of level "N2" for a time longer than a third filtering time $t_{III}$.

FIG. 6 illustrates the operating logic of the control system as a whole.

The electrical control can be characterized by five states:

control inactive: S1=0; S2=0; S3=0, that is, all the switches are inactive;

actuation request: S1=1; S2=1; S3=0: upon an action on the button 11 in the actuation direction, the switch S1 is closed, and the analog switch S2 is in the state 1.

release request: S1=0; S2=1; S3=1: upon an action on the button 11 in the releasing direction, the switch S3 is closed, and the analog switch S2 is in the state 1.

activation in progress: the activation state of the switches is inconsistent, that is, only one of the two switches S1 and S2, or S2 and S3 is activated, for a time t shorter than the filtering time.

control failure, if S2 is in the failed state.

The operating logic is illustrated by the diagram of FIG. 6 where the activated states of the system are "actuation request" and "release request", the deactivated state is "control inactive", and where the items 1 to 8 are defined as follows:
1: S2 failed: S2=2
2: Control being activated: S1=1 OR S2=1 OR S3=1
3: State of activation of the switches inconsistent for t≧filtering time (t2)
4: Control inactive: S1=0; S2=0; S3=0
5: Actuation request: S1=1; S2=1; S3=0 for t>filtering time (t3)
6: Release request: S1=0; S2=1; S3=1 for t>filtering time (t4)
7: Request active for t>filtering time (t5)—corresponds to a blocked control.
8: Absence of fault confirmed and control inactive.

A variant of this operating logic is illustrated in FIG. 7, with the same item references.

The invention claimed is:
1. A parking brake system with electric control comprising:
a computer and a control housing linked to the computer and including switches having a single stable position in an open position, and a manual control member for the switches, the control member being of monostable type with automatic return to a rest position in which all the switches are open,
wherein the housing comprises:
a single first switch for controlling actuation of brakes, arranged to be closed by an action on the control member in a first direction;
a single second switch for controlling releasing of the brakes, arranged to be closed by an action on the control member in a second direction, opposite to the first direction; and
a diagnosable circuit arranged to supply, depending on a position of the control member, analog information making it possible to distinguish between an activated state of the system in which one of the first and second switches is closed, a deactivated state of the system in which the first and second switches are open, and failed states.

2. The system as claimed in claim 1, wherein the diagnosable circuit includes a third switch arranged to be closed by an action on the control member regardless of the direction of this action, and two resistors connected to ground and respectively connected to either side of the third switch.

3. The system as claimed in claim 2, wherein a first high value resistor is connected between a first line linking a terminal of the switch to the computer, and a second line linked to ground of the computer, and a second low value resistor is connected between the other terminal of the switch and the second line.

4. The system as claimed in claim 1, wherein the computer includes means for measuring voltage at terminals of the diagnosable circuit and voltages at terminals of the first and second switches.

5. The system as claimed in claim 4, wherein the computer includes an internal clock and filtering circuits for determining a level of a voltage according to predetermined voltage thresholds and a holding time of one of the voltages according to predetermined time thresholds, and a logic circuit to deduce from the voltages and from their combination and from the time, a brake actuation or releasing command indication representative of actual action exerted on the control member.

* * * * *